United States Patent
Remans et al.

(10) Patent No.: US 6,949,181 B2
(45) Date of Patent: Sep. 27, 2005

(54) METHOD FOR IMPREGNATION OF MOLECULAR SIEVE—BINDER EXTRUDATES

(75) Inventors: Thomas Joris Remans, Amsterdam (NL); Ingrid Maria Van Vegchel, Amsterdam (NL)

(73) Assignee: Shell Oil Company, Houston, TX (US)

( * ) Notice: Subject to any disclaimer, the term of this patent is extended or adjusted under 35 U.S.C. 154(b) by 131 days.

(21) Appl. No.: 10/690,376

(22) Filed: Oct. 21, 2003

(65) Prior Publication Data

US 2004/0082461 A1 Apr. 29, 2004

Related U.S. Application Data

(62) Division of application No. 09/626,669, filed on Jul. 27, 2000, now Pat. No. 6,667,266.

(30) Foreign Application Priority Data

Jul. 27, 1999 (EP) .............................................. 99305945

(51) Int. Cl.[7] .............................................. C10G 73/38
(52) U.S. Cl. .................................... 208/27; 208/111.35
(58) Field of Search ............................. 208/27, 111.35

(56) References Cited

U.S. PATENT DOCUMENTS

| | | | |
|---|---|---|---|
| 3,832,449 A | 8/1974 | Rosinski et al. ............ | 423/328 |
| 4,076,842 A | 2/1978 | Plank et al. ................ | 423/328 |
| 4,568,656 A | 2/1986 | Poeppelmeier et al. ....... | 502/74 |
| 4,619,820 A | 10/1986 | Valyocsik .................. | 423/328 |
| 5,053,374 A | 10/1991 | Absil et al. ................ | 502/64 |
| 5,157,191 A | 10/1992 | Bowes et al. ............... | 585/533 |
| 5,300,210 A | 4/1994 | Zones et al. ................ | 208/46 |
| 5,336,478 A | 8/1994 | Dwyer et al. ............... | 423/708 |
| 5,358,628 A | 10/1994 | Apelian et al. ............. | 208/60 |
| 5,397,454 A | 3/1995 | Zones et al. ................ | 208/46 |
| 5,506,182 A | 4/1996 | Yamagishi et al. .......... | 502/66 |
| 5,641,393 A | 6/1997 | Nakagawa .................. | 208/46 |
| 5,683,572 A | 11/1997 | Nakagawa .................. | 208/46 |
| 5,952,535 A | 9/1999 | King et al. ................. | 585/475 |
| 5,986,156 A | 11/1999 | Benazzi et al. ............. | 585/475 |

FOREIGN PATENT DOCUMENTS

| | | | |
|---|---|---|---|
| EP | 0042226 A1 | 5/1981 | .......... C01B/33/28 |
| EP | 0057049 A1 | 1/1982 | .......... C01B/33/28 |
| EP | 0059059 A1 | 2/1982 | .......... C01B/33/28 |
| EP | 0065400 A2 | 5/1982 | .......... C01B/33/28 |
| EP | 0108486 A1 | 9/1983 | .......... C01B/33/28 |
| EP | 0162719 A2 | 5/1985 | .......... C01B/33/28 |
| EP | 0522196 A1 | 7/1991 | .......... C01B/33/34 |
| EP | 0519573 | 12/1992 | ........... B01J/29/12 |
| EP | 0681870 | 11/1995 | ........... B01J/29/60 |
| WO | WO 91/10587 | 7/1991 | ........... B63G/7/06 |
| WO | WO 94/22981 | 10/1994 | .......... C10G/45/64 |
| WO | WO 96/01688 | 1/1996 | ........... B01J/29/00 |
| WO | WO 96/41849 | 12/1996 | .......... C10G/45/64 |
| WO | 98/12159 | 3/1998 | ............. C07C/6/12 |

OTHER PUBLICATIONS

International Search Report of Nov. 14, 2000.
H. van Bekkum et al., Studies in Surface Science and Catalysis, vol. 58, Intro. to Zeolite Science and Practice, Elsevier, 1991, pp. 499–504.
W. J. Reagan, A. W. Chester, G. T. Kerr, J. Catal., 69 (1981) pp. 89–100.
A. Munoz–Paez, D. C. Koningsberger, J. Phys. Chem., 99 (1995) pp. 4193–4204.
R. M. Dessau, J. Catal., 77 (1982) p. 304.

*Primary Examiner*—Walter D. Griffin
(74) *Attorney, Agent, or Firm*—Charles W. Stewart

(57) ABSTRACT

Method for impregnating a Group VIII metal on a molecular sieve—binder extrudate wherein the binder comprises a low acidity refractory oxide binder material, which is essentially free of alumina, by a) contacting the molecular sieve—binder extrudate with an aqueous solution of a corresponding Group VIII metal nitrate salt having a pH of below 8, wherein the molar ratio between the Group VIII metal cations in the solution and the number of sorption sites present in the extrudate is equal to or larger than 1, and b) drying the molecular sieve—binder extrudate obtained from step a).

9 Claims, No Drawings

METHOD FOR IMPREGNATION OF MOLECULAR SIEVE— BINDER EXTRUDATES

This application is a division of application Ser. No. 09/626,669, filed on Jul. 27, 2000, now U.S. Pat. No. 6,667,266.

The invention relates to a method for impregnating a Group VIII metal on a molecular sieve—binder extrudate.

PCT patent publication No. WO-A-9641849 describes an impregnation of platinum or palladium on a dealuminated silica-bound ZSM-5 with an aqueous solution of tetramine platinum hydroxide or tetramine palladium hydroxide. The impregnation of the silica-bound ZSM-5 was followed by drying for 2 hours at 120° C. and calcined for 2 hours at 300° C. Thereafter the catalyst was activated by reduction of the platinum or palladium.

A disadvantage of the impregnation method described in PCT patent publication No. WO-A-9641849 is the long drying time. The use of shorter drying times results in a less favourable distribution of the platinum or palladium on the silica-bound ZSM-5. It is generally known that a better distribution is possible when the molecular sieve is transformed before impregnation from its H-form to a $NH_4$-form. By an "$NH_4$-form" is understood that (part of) the H+ ions in the molecular sieve are exchanged for ammonium-ions.

An example of the transformation of a molecular sieve in a $NH_4$-form before impregnation is described in US patent publication U.S. Pat. No. 5,397,454. This patent publication describes the impregnation of SSZ-32 zeolite powder with palladium. Before impregnation the zeolite was subjected to a sequence of 4 $NH_4NO_3$-ion exchanges. Hereafter it was slurried into an aqueous solution of $NH_4OH$. Then a tetramine palladium nitrate solution, of which the pH was adjusted to 9.5 with $NH_4OH$, was added slowly.

A disadvantage of this method is the long processing time for impregnation. It would be advantageous if the extrudate with the molecular sieve in its H-form could be used directly in the process of impregnating a molecular sieve—binder extrudate.

The object of the present invention is to provide a method for impregnating a Group VIII metal on a molecular sieve—binder extrudate, which allows a short drying time and results in a good distribution. Short drying times are desirable when a catalyst is prepared on a commercial scale.

This object has been achieved when the following steps are used for impregnating a Group VIII metal on a molecular sieve—binder extrudate wherein the binder comprises a low acidity refractory oxide binder material, which is essentially free of alumina. In particular it relates to a method for impregnating a Group VIII metal on such a molecular sieve—binder extrudate by ion exchange with an aqueous solution of a Group VIII metal salt. Such steps comprise:

a) contacting the molecular sieve—binder extrudate with an aqueous solution of a corresponding Group VIII metal nitrate salt having a pH of below 8, wherein the molar ratio between the Group VIII metal cations in the solution and the number of sorption sites present in the extrudate is equal to or larger than 1, and b) drying the molecular sieve—binder extrudate obtained from step a).

It has been found that with the process according to the invention a good group VIII metal distribution is obtained, while short drying times are possible. A further advantage is that the molecular sieve or molecular sieve—binder extrudate can be directly used in its H-form without the need to first transform the molecular sieve in a $NH_4$-form.

The choice of molecular sieve is not essential for obtaining the advantages of the invention, namely good distribution and short drying times. Examples of molecular sieves include metallosilicates, metallophosphates and silica metallophosphates. Possible metallo components in the framework of these molecular sieves include metals such as Al, Fe, B, Ga or Ti or combinations of these metals. Preferred molecular sieves are aluminosilicates, alumino phosphates and silica aluminium phosphates, such as SAPO-11, SAPO-31 and SAPO-41. Especially preferred molecular sieves are aluminosilicates, further referred to as zeolites. Examples of suitable zeolites include ZSM-4 (Omega), ZSM-5, ZSM-11, ZSM12, ZSM-22, ZSM-23, ZSM-35, ZSM-48, ZSM-50, Beta, X,Y and L as well as ferrierite and mordenite and isotypic framework structures thereof. When the catalyst, resulting after impregnation of the molecular sieve—binder extrudate, is to be used for catalytic dewaxing purposes, the preferred zeolite crystallites suitably have pores with a maximum diameter in the range of from 0.35 to 0.80 nm. Preferred zeolite crystallites include MFI-type zeolites having pores with diameters of 0.55 and 0.56 nm, such as ZSM-5 and silicalite, offretite having pores with diameters of approximately 0.68 nm and zeolites of the ferrierite group having pores with diameter of 0.54 nm, such as ZSM-35 and ferrierite. Another preferred class of zeolite crystallites include TON-type zeolites. Examples of TON-type zeolite crystallites are ZSM-22, Theta-1 and Nu-10 as described in U.S. Pat. No. 5,336,478, EP-A-57049 and EP-A-65400. A further preferred class of zeolite crystallites are of the MTW-type. Examples of molecular sieve crystallites having the MTW-type topology are ZSM-12, Nu-13, TEA-silicate, TPZ-3, TPZ-12, VS-12 and Theta-3 as for example described in U.S. Pat. No. 3,832,449, EP-A-513118, EP-A-59059 and EP-A-162719. A next preferred class of zeolite crystallites are of the MTT-type. Examples of zeolite crystallites having the MTT-type topology are ZSM-23, SSZ-32, ISI-4, KZ-1, EU-1, EU-4 and EU-13 as for example described U.S. Pat. No. 4,076,842, U.S. Pat. No. 4,619,820, EP-A-522196, EP-A-108486 and EP-A-42226.

The primary crystallite size of the molecular sieve can vary within a wide range of 0.001 mm to 5 mm. For catalytic dewaxing purposes the crystallite size of the zeolite may suitably be as high as 100 micron. Preferably small crystallites are used in order to achieve an optimum catalytic activity. Preferably crystallites smaller than 10 micron and more preferably smaller than 1 micron are used.

The binder of the molecular sieve—binder extrudate comprises a low acidity refractory oxide binder material, which is essentially free of alumina. Suitable binder materials, then, include low acidity refractory oxides such as silica, zirconia, titanium dioxide, germanium dioxide, boria and mixtures of two or more of these. The most preferred binder, however, is silica. The binder may occur naturally or may be in the form of gelatinous precipitates, sols or gels. The binder may also be present as a mixture of those. Preferred extrudates are those prepared by the method described in U.S. Pat. No. 5,053,374.

The weight ratio of the molecular sieve and the binder can be anywhere between 5:95 and 95:5. Lower molecular sieve content may in some cases be advantageous for achieving a higher selectivity and higher molecular sieve content is to be preferred when a higher activity is desired.

After extrusion the molecular sieve—binder extrudate is dried for a time in the range of 15 minutes to 24 hours, more preferably from 1 to 3 hours, at a temperature in the range from 10 to 350° C., more preferably from 120 to 150° C. Thereafter the catalyst composition is subjected to calcining under normal conditions, suitably at a temperature of between 400 to 900° C. by heating in air for 1 to 48, preferably 1 to 10 hours.

Step a) of the method of the invention comprises contacting the molecular sieve—binder extrudate with an aqueous solution of a corresponding Group VIII metal nitrate salt having a pH of below 8, wherein the molar ratio between the Group VIII metal cations in the solution and the number of sorption sites present in the extrudate is equal to or larger than 1. Preferably the molar ratio between the Group VIII metal cations and the number of sorption sites is between 1 and 20. A sorption site is a site where theoretically one Group VIII cation can be adsorbed. Calculation of the number of sorption sites per gram extrudate can be done as follows. An extrudate has a fixed value of moles H+ per gram extrudate. The number of moles H+ per gram extrudate is determined by means of $NH_3$-temperature programmed desorption (TPD) as is described in Zeolites, 19:288–396, 1997. The molar number of sorption sites according to the present invention is the number of moles H+ per gram extrudate divided by the valency of the cation to be impregnated. The molar ratio between the Group VIII metal cations and the number of sorption sites is thus defined as the number of moles of the Group VIII metal cation divided by the molar number of sorption sites as defined above. It is to be understood that after impregnation, the resulting catalyst (containing the modified molecular sieve—binder extrudate) may, and normally will, contain more Group VIII metals than the amount of which would be expected when the number of sorption sites is taken into account. Preferably the final catalyst has a molar ratio of Group VIII metal cations present in the extrudate and the number of sorption sites present in the extrudate equal to the ratio defined above.

The above mentioned ratio can be achieved in every way known in the art. For example such a ratio can be achieved by using a high amount or a high concentration of Group VIII metal nitrate salt in an aqueous solution to such an extent that the above mentioned ratio is obtained.

In a preferred embodiment the above mentioned ratio is obtained by reducing the number of sorption sites in the molecular sieve or molecular sieve—binder extrudate before contacting the molecular sieve—binder extrudate with the solution in step a). The number of sorption sites in the molecular sieve or molecular sieve—binder extrudate can be reduced by reducing the number of acid sites of the molecular sieve crystallites. A reduction of the number of acid sites can be achieved by methods known in the art, for example by subjecting the molecular sieve—binder extrudate to a hydrothermal treatment, for example by steaming the particles at a temperature of between 400 and 900° C.

If the molecular sieve—binder extrudate contains aluminosilicates as a molecular sieve, it has been found advantageous to subject the molecular sieve or molecular sieve—binder extrudate to a dealumination treatment prior to impregnation with the group VIII metal according to the method of the invention. Dealumination results in a reduction of the number of alumina moieties present in the aluminosilicate and hence in a reduction of the mole percentage of acid sites and hence in the number of sorption sites. Dealumination can be attained by methods known in the art. Particularly useful methods are those, wherein the dealumination selectively occurs, or anyhow is claimed to occur selectively, at the surface of the crystallites of the molecular sieve.

Examples of dealumination processes are described in WO-A-9641849. Preferably dealumination is performed by a process in which the molecular sieve or the molecular sieve—binder extrudate is contacted with an aqueous solution of a fluorosilicate salt wherein the fluorosilicate salt is represented by the formula:

$$(A)_{2/b}SiF_6$$

wherein 'A' is a metallic or non-metallic cation other than H+ having the valence 'b'. Examples of cations 'b' are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation. The molecular sieve or molecular sieve—binder extrudate material may be contacted with the fluorosilicate salt in an amount of at least 0.0075 moles per 100 grams of the molecular sieve or molecular sieve—binder extrudate material. The pH is suitably between 3 and 7. An example of the above described dealumination process is described in U.S. Pat. No. 5,157,191.

The method according to the invention can suitably be used for impregnation of any Group VIII metal, for example Pt, Pd, Ni, Ru and Co. The corresponding Group VIII metal nitrate salt can be a simple salt, such as for example $Ni(NO_3)_2$, or a complex salt, such as for example $Pt(NH_3)_4(NO_3)_2$, $Pd(NH_3)_4(NO_3)_2$, $Pt(NH_3)_6(NO_3)_4$ or $Pd(NH_3)_6(NO_3)_4$. For catalytic dewaxing purposes, salts of Pt, Pd, Ni, and mixtures thereof are preferred, and Pt is especially preferred. Preferred Group VIII metal nitrate salts for catalytic dewaxing are $Ni(NO_3)_2$, $Pt(NH_3)_4(NO_3)_2$ and $Pd(NH_3)_4(NO_3)_2$.

The total amount platinum, palladium or nickel, impregnated on the molecular sieve—binder extrudate, is suitably lower than 10% by weight calculated as element and based on total weight of molecular sieve—binder extrudate, and preferably is in the range of from 0.01 to 5.0% by weight, more preferably from 0.1 to 1.0% by weight.

For the impregnation of the molecular sieve—binder extrudate according to the method of the invention, use can be made of the various techniques known in the art, such as for example circulating solution impregnation and pore volume impregnation. Preferably pore volume impregnation is used, which is a very time-efficient technique. In this technique the volume of the solution containing the Group VIII metal salt, which is contacted with the extrudate, is about equal to the pore volume of the molecular sieve—binder extrudate to be impregnated (see also Studies in Surface Science and Catalysis, vol. 58, Introduction to zeolite science and practice, H. van Bekkum et.al. Elsevier, 1991, page 503).

The concentration of the aqueous solution of Group VIII metal salt used to achieve the required amount of metal distributed on the molecular sieve—binder extrudate can vary within wide ranges and effects the duration of the impregnation. The preferred concentration of Group VIII metal salt is less than 20%. When using pore volume impregnation, the concentration is preferably within the range of 0.02 to 10.0 by weight, most preferably from 0.2 to 2.0%. The molecular sieve—binder extrudate is contacted with the solution for a time effective to impregnate the Group VIII metal salt. The duration of the impregnation suitably varies from 5 minutes to 24 hours, more preferably varies from 5 minutes to 3 hours.

The aqueous solution used in step (a) has a pH of less than 8, preferably between 3.5 and 7. The aqueous solution may contain ammonium ions provided the pH is within the claimed range. Preferably ammonium-ions are essentially absent from the solution.

The temperature applied in step (a) is not critical and can vary within a range of below room temperature up to about 100° C., more preferably within a range of 15 to 65° C. Preferably the impregnation is performed at room temperature for reasons of convenience.

The pressure may vary within wide ranges and is not critical. For reasons of convenience the impregnation according to step (a) of the method of the invention is preferably conducted under atmospheric pressures.

Other metals may optionally be present in the molecular sieve or molecular sieve-silica extrudate, before impregnation with the Group VIII metal nitrate salt according to the method of the invention.

Step b) according to the method of the invention comprises drying the molecular sieve—binder extrudate obtained from step a). The in step a) modified molecular sieve—binder extrudate can suitably be dried at temperatures ranging from room temperature to 350° C., according to any drying profile known in the art. In a preferred embodiment the molecular sieve—binder extrudate is dried according to an accelerated drying profile having a duration of less than 90 minutes, in which the temperature is increased from about room temperature up to more than 200° C., preferably up to more than 250° C. The drying profile can comprise a continuous, linear or non-linear, increase of the temperature, or can comprise stages in which the temperature is raised and stages in which the temperature is maintained stable. For batch-wise processes a preferred accelerated drying profile comprises the following steps: raising the temperature at a rate in the range of 10° C. to 20° C. per minute, to a temperature in the range of 150° C. to 200° C.; maintaining this temperature for an amount of time in the range of 5 to 15 minutes; raising the temperature at a rate in the range of 10° C. to 40° C. per minute, to a temperature in the range of 250° C. to 300° C.; maintaining this temperature for an amount of time in the range of 10 to 20 minutes; cooling down to room temperature. For continuous processes a preferred accelerated drying profile comprises a continuous temperature increase, wherein the increase can be gradually or wherein the rate of temperature increase varies. The use of this accelerated drying profile can decrease the drying time which is especially advantageous when a catalyst is prepared on a commercial scale. As will become clear from the examples, impregnation according to the method of the invention allows one to use such an accelerated drying profile while still obtaining a good distribution of the metal over the molecular sieve—binder extrudate.

After drying, the molecular sieve—binder extrudate is optionally calcined at a temperature between about 350° C. and 500° C.

The catalyst containing the molecular sieve—binder extrudate may be activated before use, in any way known in the art, for example by reducing of the Group VIII cation with hydrogen.

The catalyst resulting after the treatment of a molecular sieve—binder extrudate according to the method of the invention can be used in any hydrocarbon conversion reaction. Examples of such hydrocarbon conversion reactions are hydrocracking, isomerization, alkylation, hydrogenation, dehydrogenation, polymerization, reforming, catalytic cracking and catalytic hydrocracking. The catalyst may be suitably used in catalytic dewaxing. By catalytic dewaxing is meant a process for decreasing the pour point of lubricating base oil products by selectively converting the components of the oil feed which impart a high pour point to products which do not impart a high pour point. Products which impart a high pour point are compounds having a high melting point. These compounds are referred to as waxes. Wax compounds include for example high temperature melting normal paraffins, iso-paraffins and mono-ringed compounds. The pour point is preferably reduced by at least 10° C. and more preferably by at least 20° C. Examples of such catalytic dewaxing processes are described in the before mentioned PCT patent publication No. 9641849.

The catalyst can be used in the catalytic dewaxing of any kind of hydrocarbon feed. Suitably the catalyst can be used in the catalytic dewaxing of lubricants, base oil products, gas oils and feeds having relatively high amounts of waxy compounds. Examples of feeds with a high amount of waxy compounds are synthetic waxy raffinates (Fischer-Tropsch waxy raffinates), hydrocracker bottom fractions (hydrowax) and slack waxes obtained from the dewaxing of hydroprocessed or solvent refined waxy distillates.

The method of the invention will now be illustrated by the following non-limiting examples.

COMPARATIVE EXAMPLE A

ZSM-5/silica extrudate (30%/70% w/w, calcined at 800° C.) was treated with a 0.01 M aqueous ammonium hexafluorosilicate (AHS) solution, washed, dried and calcined. The extrudate contained 0.048 H+ mmoles/gram extrudate. Hereafter 22.65 gram of the extrudate was impregnated with about 0.7% w/w platinum by pore volume impregnation in 5 minutes with 16.23 ml of a 5.0 M aqueous solution containing 2.79 gram of a tetramine platinum hydroxide $(Pt(NH_3)_4(OH)_2)$-solution (5.9% w/w Pt). The pH of the solution was >8. The impregnated extrudate was not washed, but dried according to a slow drying profile by; drying during 2 hours at 120° C.; whereafter the temperature was raised with 25° C./minute to 190° C. and held stable during 1 hours; whereafter the temperature was raised again with 50° C./minute to a temperature of 300° C. and held stable during 1 hour. Hereafter the extrudate was cooled down to room temperature. The 0.048 H+ mmoles/gram extrudate correspond with 0.024 mmoles sorption sites for Pt 2+ cations. 22.65 gram extrudate contains 0.54 mmoles sorption sites. From the above it can be calculated that the solution contained 0.84 mmoles Pt2+ cations. Thus the molar ratio between the Pt 2+ cations and the number of sorption sites was 1.55. The obtained platinum distribution was examined visually and was satisfactory.

COMPARATIVE EXAMPLE B

ZSM-5/silica extrudate (30%/70% w/w, calcined at 800° C.) was treated with 0.01 M AHS, washed, dried and calcined. The extrudate contained 0.048 H+ mmoles/gram extrudate. Hereafter 29.15 gram of the extrudate was impregnated with about 0.7% platinum by pore volume impregnation in 5 minutes with 20.96 ml of an aqueous solution containing 3.59 gram of a tetramine platinum hydroxide $(Pt(NH_3)_4(OH)_2)$-solution (5.9% w/w Pt). The pH of the solution was >8. The extrudate was not washed but dried by an accelerated drying profile; by raising the temperature with 15° C./minute to 180° C.; maintaining this temperature for 10 minutes; raising the temperature again with 30° C./minute to 290° C.; maintaining this temperature for 15 minutes. Hereafter the extrudate was cooled down to room temperature. The molar ratio between the Pt 2+ cations and the number of sorption sites was 1.55. No distribution of the platinum was obtained since the tetramine platinum hydroxide complex did not decompose.

EXAMPLE 1

ZSM-5/silica extrudate (30%/70% w/w, calcined at 800° C.) was treated with 0.01 M AHS, washed, dried and calcined. The extrudate contained 0.048 H+ mmoles/gram extrudate. Hereafter 29.15 gram of the extrudate was impregnated with about 0.7% w/w platinum by pore volume impregnation in 5 minutes with 20.96 ml of an aqueous solution containing 6.82 gram of a tetramine platinum nitrate (Pt(NH$_3$)$_4$(NO$_3$)$_2$-solution (2.99% w/w Pt) The pH of the solution was about 6. The extrudate was not washed but dried and calcined by an accelerated drying profile; by raising the temperature with 15° C./minute to 180° C.; maintaining this temperature for 10 minutes; raising the temperature again with 30° C./minute to 290° C.; maintaining this temperature for 15 minutes. Hereafter the extrudate was cooled down to room temperature. The molar ratio between the Pt 2+ cations and the number of sorption sites was 1.49. A good platinum distribution was obtained.

EXAMPLE 2

ZSM-5/silica extrudate (30%/70% w/w, calcined at 800° C.) was treated with an AHS solution, washed, dried and calcined. The extrudate contained 0.048 H+ mmoles/gram extrudate. Hereafter 47.96 gram of the extrudate was impregnated with about 0.7% w/w Nickel by pore volume impregnation in about 15 minutes with 30.74 ml of a aqueous solution containing 1.68 gram of a nickel nitrate salt (Ni(NO$_3$)$_2$.6H$_2$O). The pH of the solution was about 4. The extrudate was washed and dried and calcined by an accelerated drying profile; by raising the temperature with 15° C./minute to 180° C.; maintaining this temperature for 10 minutes; raising the temperature again with 30° C./minute to 300° C.; maintaining this temperature for 15 minutes. Hereafter the extrudate was cooled down to room temperature. The molar ratio between the Ni 2+ cations and the number of sorption sites present in the extrudate was 5.0. A good nickel distribution was obtained.

A summary of the results obtained in the examples is given in Table 1. In Comparative example A, a satisfactory distribution result was obtained by using tetramine platinum hydroxide and a slow drying profile. When an accelerated drying profile was used instead of the slow drying profile, as illustrated in Comparative example B, the tetramine platinum hydroxide complex was found not to decompose. When this catalyst was subsequently activated in a reductive atmosphere, a migration of Pt to the exterior of the catalyst was observed, resulting in an unacceptable loss of performance. Examples 1 and 2 show that an accelerated drying profile can be used, while obtaining at the same time full decomposition of the complex as well as a good distribution, when a Group VIII metal nitrate complex is used according to the invention.

1, wherein the binder comprises a silica binder material, wherein the number of sorption sites in the molecular sieve—binder extrudate is reduced prior to the impregnation of the Group VIII metal by means of a dealumination treatment which treatment comprises contacting the molecular sieve—binder extrudate with a solution of ammonium hexafluorosilicate; and wherein the molecular sieve is in its H-form, and b) drying the molecular sieve—binder extrudate obtained from step a) in accordance with an accelerated drying profile by which the temperature of the molecular sieve—binder extrudate obtained from step a) is raised to no more than 300° C. and for a duration of less than 90 minutes prior to the use of the resulting dried, impregnated molecular sieve—binder extrudate, and c) yielding a product having a reduced pour point.

2. A process as recited in claim 1, wherein the molar ratio between the Group VIII metal cations and the number of sorption sites is between 1 and 20.

3. A process as recited in claim 2, wherein the Group VIII metal is Ni, Pt, and/or Pd.

4. A process as recited in claim 3, wherein the Group VIII metal nitrate salt is Ni(NO$_3$)$_2$, Pt(NH$_3$)$_4$(NO$_3$)$_2$ or Pd(NH$_3$)$_4$(NO$_3$)$_2$.

5. A process as recited in claim 4, wherein the molecular sieve is of the MFI, TON, MTT or MTW type.

6. A process as recited in claim 5, wherein step a) is performed with an aqueous solution of the corresponding Group VIII metal nitrate salt having a pH in the range from 3.5 to 7.

7. A process as recited in claim 6, wherein step a) is performed by pore volume impregnation.

8. A process as recited in claim 7, wherein the molecular sieve is in its H-form before impregnation.

9. A process as recited in claim 8, wherein the accelerated drying profile comprises the steps of:

raising the temperature of the molecular sieve—binder extrudate obtained from step a) at a rate in the range of from 10° C. to 20° C. per minute to a first temperature in the range of from 150° C. to 200° C.;

TABLE 1

| Experiment | Group VIII metal salt used | pH of the solution | Form of the molecular sieve | drying profile | ratio of Group VIII metal cations over sorption sites | Distribution result |
|---|---|---|---|---|---|---|
| A | Pt(NH$_3$)$_4$(OH)$_2$ | >8 | H-form | slow | 1.55 | satisfactory |
| B | Pt(NH$_3$)$_4$(OH)$_2$ | >8 | H-form | accelerated | 1.55 | the complex did not decompose |
| 1 | Pt(NH$_3$)$_4$(NO$_3$)$_2$ | ±6 | H-form | accelerated | 1.49 | good |
| 2 | Ni(NO$_3$)$_2$.6H$_2$O | ±4 | H-form | accelerated | 5.0 | good |

We claim:

1. A catalytic dewaxing process comprising: contacting a lubricating base oil under catalytic dewaxing conditions with a composition made by a) contacting a molecular sieve—binder extrudate, having sorption sites, with an aqueous solution of a corresponding Group VIII metal nitrate salt having a pH of below 8 and in the essential absence of ammonium ions, wherein the molar ratio between the Group VIII metal cations in the solution and the number of sorption sites present in the extrudate is equal to or larger than maintaining the first temperature for a time period in the range of from 5 to 15 minutes;

thereafter raising the temperature at a rate in the range of from 10° C. to 40° C. per minute to a second temperature in the range of from 250° C. to 300° C.;

maintaining the second temperature for a time period in the range of from 10 to 20 minutes; and thereafter reducing the temperature.

* * * * *